E. S. MARSH.
SPRING MOTOR AND WINDING MEANS THEREFOR.
APPLICATION FILED MAY 29, 1916.

1,380,111.

Patented May 31, 1921.
4 SHEETS—SHEET 1.

Inventor:
Edward S Marsh
by Davis & Timms
his attorneys

E. S. MARSH.
SPRING MOTOR AND WINDING MEANS THEREFOR.
APPLICATION FILED MAY 29, 1916.

1,380,111.

Patented May 31, 1921.
4 SHEETS—SHEET 2.

Inventor:
Edward S. Marsh
by Davis & Simms
his Attorneys

E. S. MARSH.
SPRING MOTOR AND WINDING MEANS THEREFOR.
APPLICATION FILED MAY 29, 1916.
1,380,111.
Patented May 31, 1921.
4 SHEETS—SHEET 3.
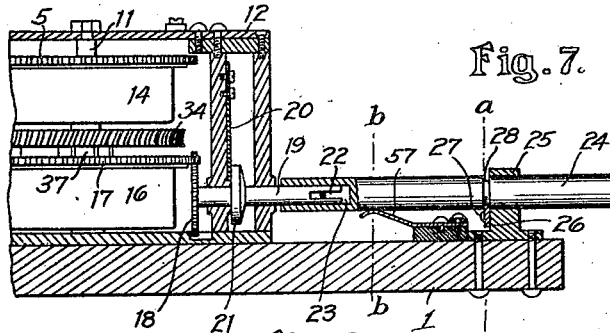
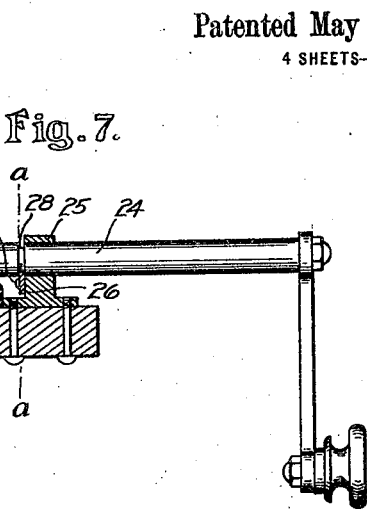
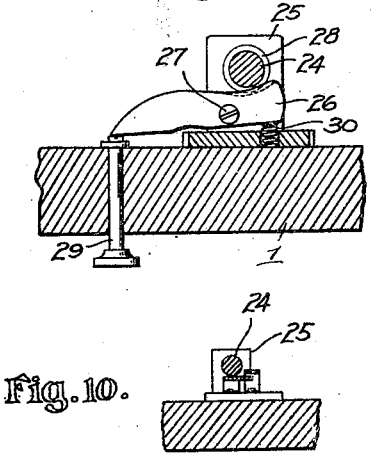
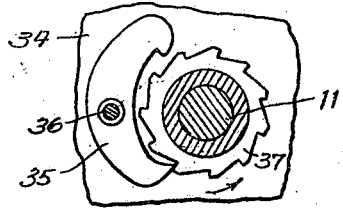
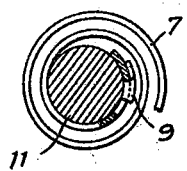
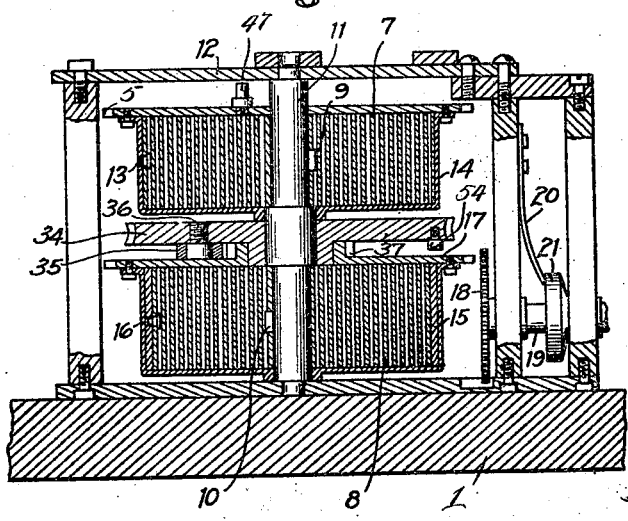

E. S. MARSH.
SPRING MOTOR AND WINDING MEANS THEREFOR.
APPLICATION FILED MAY 29, 1916.
1,380,111.
Patented May 31, 1921.
4 SHEETS—SHEET 4.
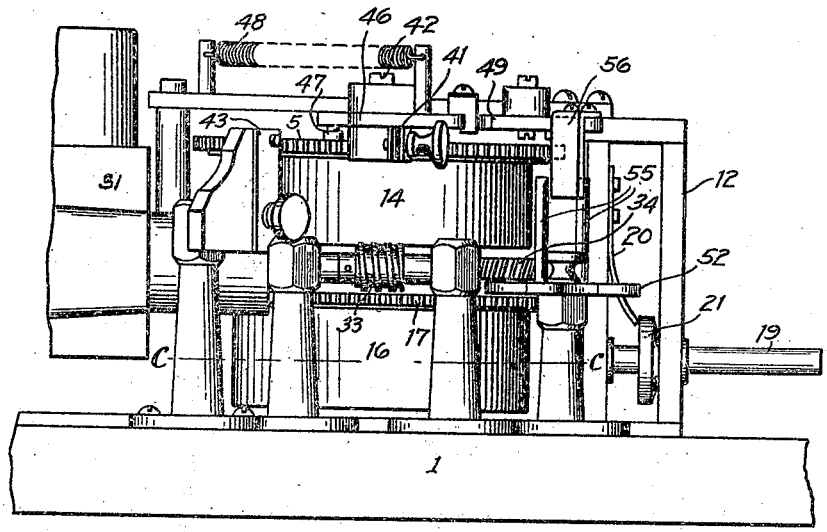
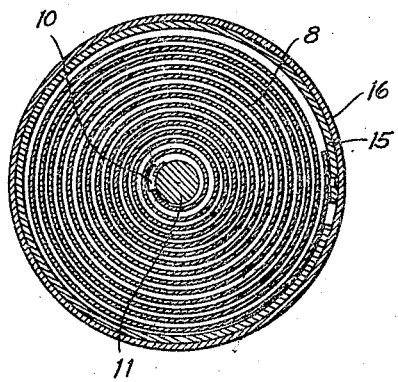
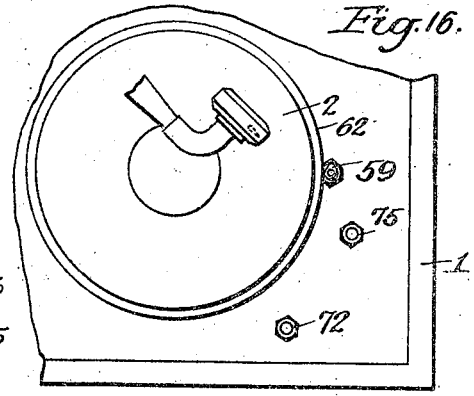
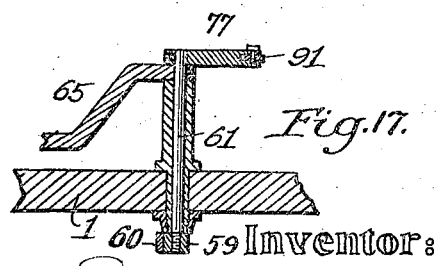
Inventor:
Edward S. Marsh
by Davis & Timms
his attorneys

UNITED STATES PATENT OFFICE.

EDWARD S. MARSH, OF ROCHESTER, NEW YORK.

SPRING-MOTOR AND WINDING MEANS THEREFOR.

1,380,111.        Specification of Letters Patent.      Patented May 31, 1921.

Original application filed October 18, 1915, Serial No. 56,424. Divided and this application filed May 29, 1916. Serial No. 100,683.

*To all whom it may concern:*

Be it known that I, EDWARD S. MARSH, a citizen of the United States, and resident of Rochester, in the county of Monroe and State of New York, have invented certain new and useful Improvements in Spring-Motors and Winding Means Therefor, of which the following is a specification.

The present invention relates to spring motors and winding means therefor, and it has for an object to provide for winding a spring motor by an electric motor which is so controlled that the operation of the spring motor is substantially constant, the spring motor being rewound at short intervals of time and while in operation. Another object of the invention is to provide a driving connection between a spring motor and an electric motor so constructed that, while the driving connection is maintained at all times, yet it is impossible for the spring motor to react upon the electric motor while the latter is not in action. Another object of the invention is to provide a construction in which both the electrical and the mechanical winding means are provided and are so connected with the spring motor that one cannot interfere with the operation of the other. Still another object of the invention is to provide a construction in which the electric motor is thrown into and out of operation at certain periods and in which the circuit of the electric motor is broken by a quick action when said motor is cut out.

To these and other ends, the invention consists of certain parts and combinations of parts all of which will be hereinafter described, the novel features being pointed out in the appended claims.

In the drawings:—

Fig. 7 is a detail view showing the manually operable means for winding the motor;

Fig. 8 is a vertical section through the spring motor;

Fig. 9 is a section on the line *a—a*, Fig. 7;

Fig. 10 is a section on the line *b—b*, Fig. 7;

Fig. 11 is a detail view of the ratchet interposed between the electric motor and the spring motor;

Figs. 12 and 13 are detail views showing the manner of connecting the two springs to a single arbor.

Fig. 14 is an elevation of some of the parts shown in Fig. 1.

Fig. 15 is a horizontal section on a line C C, Fig. 14.

Fig. 16 is a detail view showing, in plan, the relation of the brake to the record support and the position of the plungers which effect the starting and stopping of the machine and Fig. 17 is a detail sectional view showing the mounting of the brake.

Figure 1:
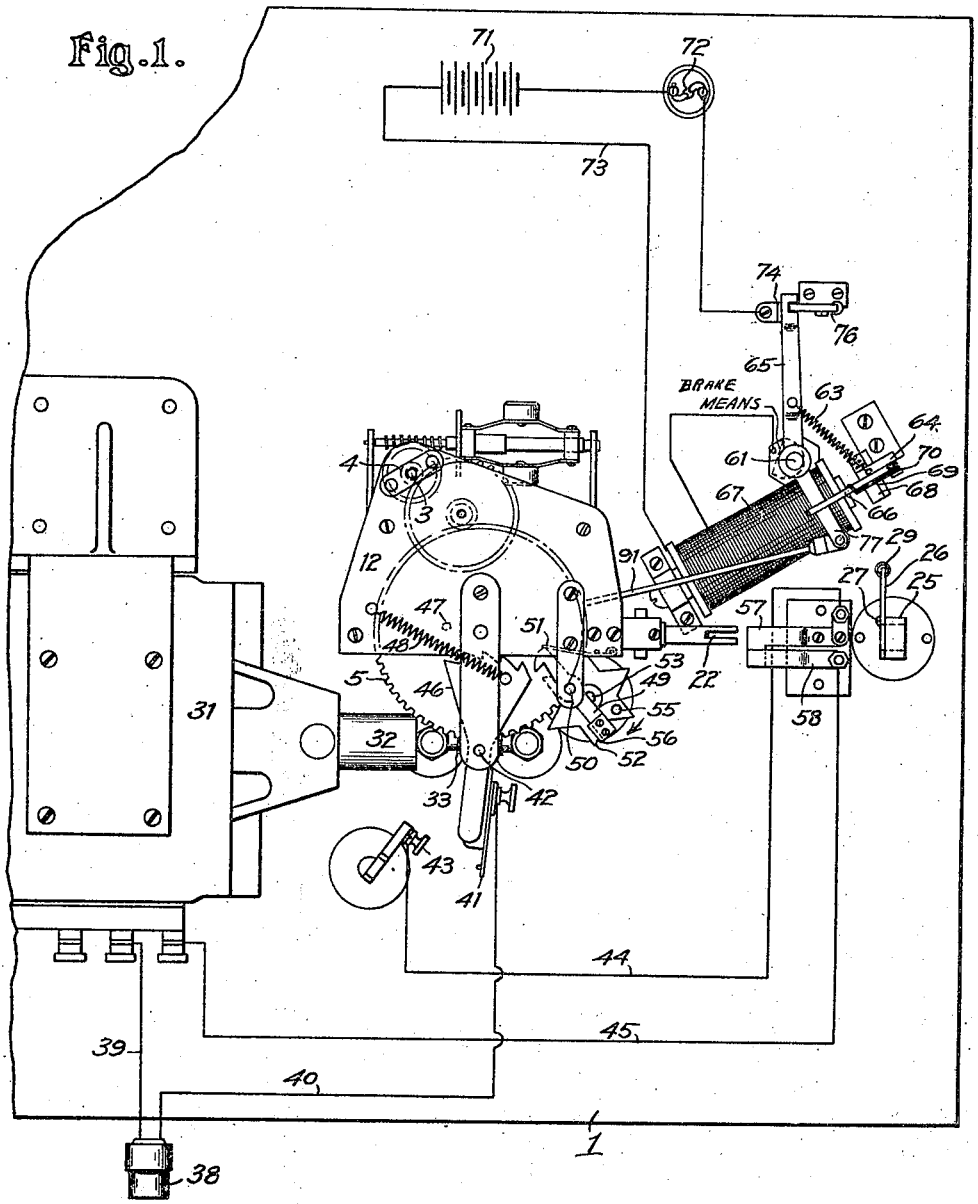
Figure 1 is a diagrammatic view showing the spring motor and the devices connected thereto, the switch of the circuit of the electric motor being open.
Figure 2:
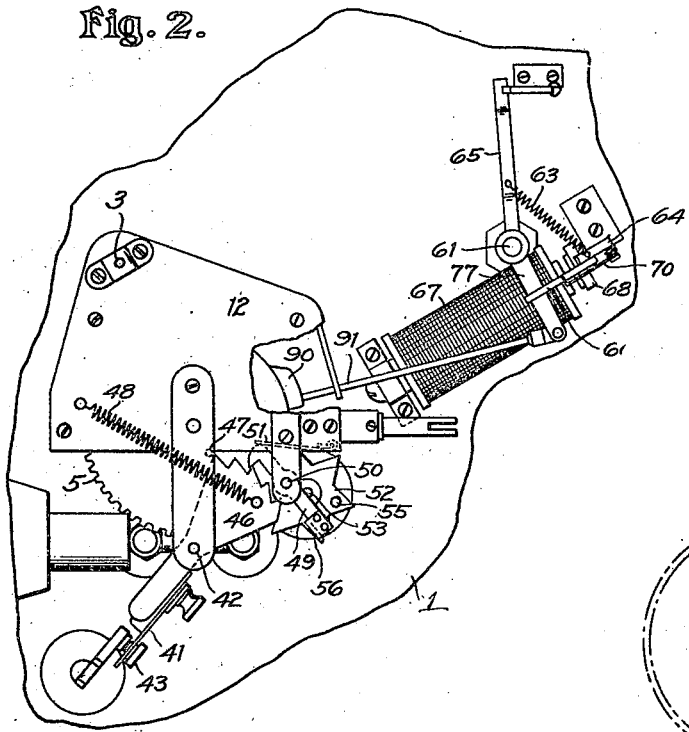
Fig. 2 is a detail view showing the switch of the electric motor closed.
Figure 5:
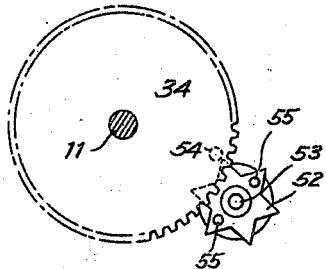
Fig. 5 is a detail view of the devices for releasing the movable contact which controls the electric motor.
Figure 3:
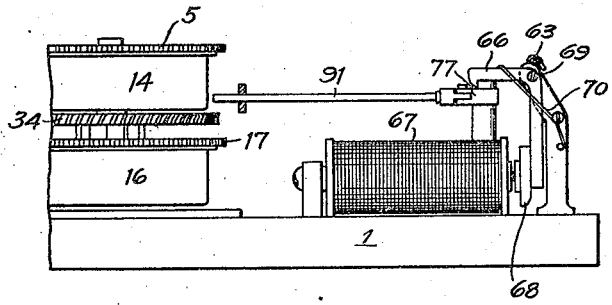
Figs. 3 and 4 are detail views illustrating the operation of the brake.
Figure 6:
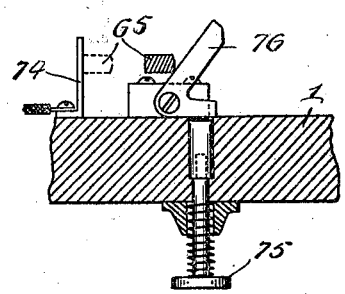
Fig. 6 is a detail view of the device for closing the switch of the brake circuit.
Figure 4:
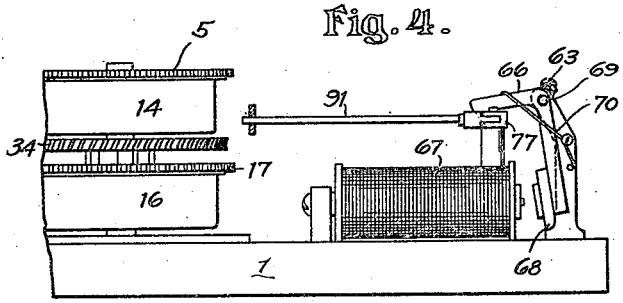

Referring more particularly to the drawings, 1 indicates a table above which the record 2 is supported on a rotary record support 62, the shaft 3 of the record support being extended through the table and carrying a pinion 4 which is connected with a drive gear 5 of the spring motor. The latter, in this instance, embodies two volute springs 7 and 8 wound in opposite directions and having their inner ends secured at 9 and 10, respectively, to an arbor 11 which is journaled in the frame 12. The outer end of the spring 7 is secured at 13 to a casing 14, one wall of which is formed by the gear 5, the casing being journaled on the arbor 11. The outer end of the spring 8 is secured to a split ring 15 which has frictional engagement with the interior wall of a drum 16, and which is of heavier stock than the spring 8 so as to provide a stronger frictional engagement than would be possible with the spring 8 alone, the drum being journaled on the arbor 11 and carrying a gear 17.

For the manual winding of the spring motor there may be employed a pinion 18 journaled in the frame 12 and adapted to move axially into and out of mesh with the gear 17. This pinion 18 is mounted on a shaft 19 which is acted upon by a spring 20 bearing against an annular enlargement 21, the end of the shaft being bifurcated at 22. This bifurcated end is adapted to be engaged by the socketed end 23 of a crank handle 24 which is removably held in a bearing 25. The crank handle may be locked in engagement with the shaft 19 by a latch 26 pivoted at 27 to the bearing bracket 25 and having one end normally pressed into an annular groove 28 in the crank handle 24. When the latch 26 lies in this groove, the handle is locked to the machine and the gear 18 is in mesh with the gear 17. A plunger 29 extends through the support 1 and coöperates with this latch 26 in order to move it against the action of the spring 30 and to free it from the groove 28. Upon such movement of the latch, the spring 20 moves the gear 18 and the crank handle 24 axially, thus destroying driving connection between the crank handle and the spring motor.

Energy may also be stored in the spring motor by an electric motor 31, the shaft 32 of which may be provided with a worm 33 which meshes with a worm wheel 34 and has ratchet connection with the gear 17 of the spring motor, permitting the gear 17 to be rotated by the manual winding means independently of the electrically operated winding means. In this instance, the ratchet connection embodies an escapement pawl 35 pivoted at 36 to the worm wheel 34 and adapted to coöperate with an escapement wheel 37 formed on the gear 17. It will be noted that the driving connection between the electric motor and the spring motor is secured without the use of a large number of gear wheels which would tend to increase the noise of the apparatus. Furthermore, this driving connection acts as a locking device to hold the spring motor against movement, it being impossible for the spring motor to transmit motion through the worm wheel 34 and the worm 33 to the rotating part of the electric motor. This spring also acts as a brake on the electric motor and stops the latter almost immediately that the current is shut off.

Current to the motor may be supplied by a lamp-socket 38 adapted to be attached to a suitable source of supply and having one of its terminals connected by a conductor 39 to the motor and its other terminal connected by a conductor 40 to a movable contact 41 which is pivotally mounted at 42 to coöperate with a stationary contact 43 that connects by conductors 44 and 45 with the electric motor.

With the end in view of establishing connection periodically between the contacts 41 and 43, the movable contact may carry a ratchet or toothed member 46 which lies in the path of a projection 47 arranged on the gear 5, said projection on each rotation of the gear 5 engaging successively with the teeth of the tooth or ratchet member 46 so as to move the movable contact on its pivot 42 toward the stationary member 43 and against the action of the spring 48 which is secured at one end to the member 46 and at the other end to the frame 12. To hold this ratchet or toothed member, after it has been shifted, there may be provided a pawl 49 pivoted at 50 and moved toward the ratchet by a spring 51, three rotations of the wheel 5 causing the contact 41 to move from its extreme outer position to the contact 43.

In order to stop the electric motor after a certain period of time, there may be provided a star-wheel 52 rotatably mounted at 53 and having its projections engaged, one on each rotation of the worm wheel 34, by a projection 54 arranged on the worm wheel. The star-wheel carries two projections 55 at diametrically opposite points for engagement with a laterally turned portion 56 on the pawl 49, each projection 55 acting on the portion 56 to release the ratchet member 46 and then to free the pawl, this freeing of the pawl being due to the fact that the pawl and the star-wheel turn about different centers.

The pin 55 slips past the lug 56 after such pin has moved the lug a certain distance, and this action takes place immediately after the ratchet 46 escapes from the pawl, the momentum of the electric motor being sufficient to carry the projection 55 the slight distance necessary to pass the portion 56, and so to permit the pawl to regain its normal position. The spring 51 then throws the pawl toward the part 46.

To the end that the electric motor will be cut out of action while the manual winding means is in connection with the spring motor, the switch preferably embodies two spring arms 57 and 58, normally in contact, and one of said arms lying in the path of the crank shaft 24, so that when the shaft is introduced into driving connection with the shaft 19, the contact 57 will be disengaged from the contact 58.

For stopping the spring motor there may be provided a brake preferably in the form of an eccentric 59 having a yielding portion 60 and carried by a shaft 61 so as to be in coöperative relation with the rotary record support 62 which carries the record 2. This brake has preferably a normal tendency to move to braking position, this tendency being produced by a spring 63 anchored at one end to a bracket 64 and at the other end to an arm 65 which is secured to a shaft 61 of the brake. To hold the brake out of braking position, a latch 66 may be employed controlled preferably by an electromagnet 67 whose armature 68 is connected to the latch 66, the latter being pivoted at 69 to the bracket 64 and being moved to latching position by a spring 70. The magnet 67 may be energized by a battery 71 which is controlled by a switch 72 in a circuit 73 with the magnet. It is desirable to break the circuit 73 after the magnet has been energized to operate the latch 66 and, to this end, the arm 65 on the brake shaft 61 is connected in the circuit 73 and coöperates with the contact 74 when the brake is out of braking position but moves out of engagement with the contact 74 when the brake moves into braking position, thus breaking the circuit 73. The brake of stop 59 is moved out of engagement with the table preferably by a spring pressed plunger 75 extending through the table 1 and coöperating with a bell crank lever 76 which bears against the arm 65. The depression of the plunger 75 shifts the arm 65 until the latch 66 engages the arm 77 on the brake shaft 61.

So that the spring motor shall not be overwound or the electric motor shall not continue its operation unnecessarily due to the stopping of the spring motor while the pin 47 is in engagement with the ratchet member 46 and the switch of the electric motor is closed, means is provided which will hold the brake out of action until such time that the projection 47 has passed out of engagement with the ratchet member 46. This means comprises preferably a projection 90 formed on the casing 14 and adapted to coöperate with a plunger 91 during the time that the projection 47 engages the member 46. The plunger 91 connects with the arm 77 on the brake shaft 61 so that the brake shaft is held against turning at this time.

In the operation of the invention, the spring motor has energy stored therein by means either of the crank handle 24 or the electric motor. When using the crank handle, the latter is connected with a pinion 18 and by the contacts 57 and 58 breaks the circuit to the electric motor. When the crank handle is turned, the two springs are wound without disturbing the electric motor, due to the fact that the worm wheel 34 has a ratchet connection with the gear 17. The overwinding of the spring motor cannot be accomplished as the electric motor must stop almost immediately after the spring motor ceases to operate. The winding of the spring motor is effected periodically and before the spring motor has run down to any great extent. At such time, at every rotation of the gear wheel 5, the projection 47 engages one of the teeth on the rack 46 until the contact 41 engages the contact 43, thus establishing a circuit through the electric motor and causing the latter to turn the worm wheel until such a time that the projection 54 on the worm wheel 34 shall have turned the star-wheel a sufficient distance to cause the pawl 49 to release the ratchet member 46 so that the contact 41 may quickly move away from the contact 43 and cut out the electric motor. For starting the talking machine, the plunger 75 is depressed causing the brake 59 to move out of engagement with the rotary record support 62; and for stopping the machine, the plunger switch 72 is pressed causing the electrical magnet 67 to be energized in order to operate the latch 66 to release the brake 59 for engagement with the rotary record support 62. The brake is held against action while the projection 47 is in engagement with the rack 46, this being accomplished by means of the projection 90 which engages the plunger 91.

From the foregoing, it will be seen that there has been provided a spring motor having two winding mechanisms, one of which is operated manually and the other of which is operated automatically by an electric motor. The electric motor is cut out while the manual winding means is in operation and is connected to the spring motor by a driving gear which acts as a lock to prevent the unwinding of the spring and, at the same time, causes the spring to act as a brake on the motor. A safety device is provided which is so arranged that neither the manual winding means nor the electric motor can overwind the spring. The movable contact which controls the electric motor is moved gradually toward the stationary contact and is released suddenly so that it may be quickly carried away from the stationary contact to prevent arcing.

This application is a division of an application filed by me on October 18, 1915, Serial No. 56,424.

What I claim as my invention and desire to secure by Letters Patent is:—

1. In a talking machine the combination with a spring motor, and an electric motor for winding the same having a switch in its circuit, of a switch-actuating means operating automatically to close the switch, means for automatically opening the switch, a brake for stopping the spring motor, and means for preventing the brake from operating while the switch-actuating means is in the position to prevent the movement of the switch to open position.

2. In an apparatus of the class described, the combination with a spring motor, and an electric motor, for winding it, of a manually operable means for winding the spring motor, a spring for normally holding said manually operable means out of connection with the spring motor, and a latch for holding the manually operable means in connection with the spring motor.

3. In an apparatus of the class described, the combination with a spring motor and an electric motor for winding the same, of a gear wheel connected to the spring motor, an axially movable gear adapted to mesh with the gear connected to the spring motor, a spring acting on said axially movable gear to move it out of connection with the gear on the spring motor, a crank handle having a detachable connection with the axially movable gear and provided with a surrounding groove, and a latch adapted to enter said groove to lock the crank handle to the axially movable gear and also to lock the axially movable gear in connection with the gear that is connected to the spring motor.

4. In an apparatus of the class described, the combination with a spring motor and an electric motor for winding the same, of a switch for controlling the electric motor having a movable contact, a spring acting on said contact to open the switch, a device operated by the spring motor for moving the switch contact step-by-step to closed position, a pawl for holding the switch in different positions to which it is moved by said device, and a trip operated by the electric motor to shift the pawl in order to release the movable contact to the action of the spring after the circuit has been closed for a definite time.

5. In an apparatus of the class described, the combination with a spring motor and an electric motor for winding the same, of a switch for controlling the electric motor having a movable contact, a spring acting on said contact to open the switch, a member having a plurality of teeth connected to the contact, a device operated by the spring motor for engaging the toothed member to shift the latter step-by-step and consequently the movable contact to close the switch, a pawl for coöperation with said toothed member to hold the latter in its different shifted positions, and a trip device controlled by the electric motor for shifting the pawl out of coöperation with the toothed member to release the movable contact to the action of the spring.

6. In an apparatus of the class described, the combination with a spring motor and an electric motor for winding the same, of a switch for controlling the electric motor and a pawl and ratchet device controlling the make and break of said switch and controlled by the spring motor and by the electric motor.

7. In an apparatus of the class described, the combination with a spring motor and an electric motor for winding the same, of a switch controlling the circuit of the electric motor and having a movable contact, a toothed device connected to the movable contact, a projection on the spring motor successively engaging the teeth of said toothed device to move the contact, a pawl coöperating with the toothed device for holding the latter to the position to which it is moved by the projection, a spring acting on said toothed device, a star-wheel having a projection for coöperation with the pawl, and a projection moved by the electric motor and engaging said star-wheel to cause the projection on the said star-wheel to trip the pawl.

8. In a talking machine, the combination with a record support and a motor for driving the same, of a table lying between the motor and the record support, a shaft journaled in the table and having a brake above the same to engage the record support and an arm below the table, a plunger guided in the table to one side of the shaft, and a bell-crank member interposed between the plunger and the arm of the shaft to shift the brake from braking position when the plunger is depressed.

9. In a talking machine, the combination with a spring motor and an electric motor for winding the same having a switch in its circuit, of switch-actuating means controlled by the spring motor for closing said switch, a brake for stopping the spring motor, and means for preventing the brake from operating while the switch-actuating means is in a position to prevent the movement of the switch to open position.

10. In a talking machine, the combination with a spring motor and an electric motor for winding the same having a switch in its circuit, of switch-actuating means actuated by the spring motor for closing the switch, a brake for stopping the spring motor, a projection rotated by the spring motor, a spring for moving the brake to braking position, and a device connected to the brake and engaged by said projection to prevent the brake from operating while the switch-actuating means is in a position to prevent the movement of the switch to open position.

11. In a talking machine, the combination with a spring motor and an electric motor for winding the same having a switch in its circuit, of switch-actuating means controlled by the spring motor for closing the switch, a brake for stopping the spring motor having a shaft, an arm on the shaft, a rod connected to the arm, and a projection moved by the spring motor into the path of said rod to prevent the brake from operating while the switch-actuating means is in a position to prevent the movement of the switch to open position.

12. In an apparatus of the class described, the combination with a spring motor and an electric motor for winding the same, of a switch for controlling the electric motor, a pawl and ratchet device controlling the make and brake of said switch, means controlled by the spring motor for shifting the pawl and ratchet device to close the switch, a brake for stopping the spring motor, and means for preventing the brake from operating while the shifting means for the pawl and ratchet device is in a position to prevent the movement of the switch to open position.

EDWARD S. MARSH.